United States Patent
Agashe et al.

(10) Patent No.: US 9,049,581 B2
(45) Date of Patent: Jun. 2, 2015

(54) UTILIZING SYSTEM ACCESS SEQUENCES TO REQUEST RESOURCES FOR GCI REPORTING IN WIRELESS NETWORKS

(75) Inventors: Parag A. Agashe, San Diego, CA (US); Peter A. Barany, San Diego, CA (US); Rajarshi Gupta, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 387 days.

(21) Appl. No.: 12/471,976

(22) Filed: May 26, 2009

(65) Prior Publication Data
US 2009/0316652 A1    Dec. 24, 2009

Related U.S. Application Data

(60) Provisional application No. 61/074,957, filed on Jun. 23, 2008.

(51) Int. Cl.
| | |
|---|---|
| *H04L 12/26* | (2006.01) |
| *H04W 4/20* | (2009.01) |
| *H04W 36/00* | (2009.01) |
| *H04W 8/26* | (2009.01) |
| *H04W 72/04* | (2009.01) |
| *H04W 88/08* | (2009.01) |

(52) U.S. Cl.
CPC .............. *H04W 4/20* (2013.01); *H04W 36/0016* (2013.01); *H04W 36/0077* (2013.01); *H04W 8/26* (2013.01); *H04W 72/0413* (2013.01); *H04W 88/08* (2013.01)

(58) Field of Classification Search
None
See application file for complete search history.

(56) References Cited

U.S. PATENT DOCUMENTS

| | | |
|---|---|---|
| 2005/0070283 A1 | 3/2005 | Hashimoto et al. |
| 2005/0243772 A1 | 11/2005 | Lee et al. |
| 2007/0047493 A1 | 3/2007 | Park et al. |
| 2007/0253372 A1 | 11/2007 | Nakayasu |
| 2009/0047960 A1* | 2/2009 | Gunnarsson et al. ......... 455/436 |

(Continued)

FOREIGN PATENT DOCUMENTS

| | | |
|---|---|---|
| CN | 1691828 A | 11/2005 |
| CN | 101043714 A | 9/2007 |
| EP | 1635511 A1 | 3/2006 |

(Continued)

OTHER PUBLICATIONS

Huawei, "Detection of Conflicting Cell Identities", Oct. 8-10, 2007, 3GPP TSG-RAN-WG2 Meeting #59bis, R2-074216.*

(Continued)

*Primary Examiner* — Khoa Huynh
(74) *Attorney, Agent, or Firm* — Ashish L. Patel

(57) ABSTRACT

Systems and methodologies are described that facilitate indicating global cell identifier (GCI) reporting in wireless communication to mitigate confusion caused by physical cell identifier (PCI) reporting in heterogeneous deployments. In particular, mobile devices can report GCI of access points to disparate access points to facilitate communication therebetween, such as during handover. Mobile devices can indicate GCI reporting during a system access request by selecting an access sequence corresponding to subsequent GCI reporting. Based on the access sequence, an access point can grant additional resources to receive the GCI, and the mobile device can communicate GCI over the resources. Using the GCI, the access point can communicate with a disparate access point related to the GCI.

45 Claims, 12 Drawing Sheets

(56) References Cited

U.S. PATENT DOCUMENTS

2009/0092097 A1* 4/2009 Nylander et al. ............ 370/331
2010/0197311 A1* 8/2010 Walldeen et al. ............ 455/444

FOREIGN PATENT DOCUMENTS

| EP | 1928126 A2 | 6/2008 |
|---|---|---|
| JP | 2005109570 | 4/2005 |
| JP | 2007295318 A | 11/2007 |
| KR | 20050104191 A | 11/2005 |
| WO | 2006061671 A1 | 6/2006 |

OTHER PUBLICATIONS

3GPP Organizational Partners (Arib, et al; "3GPP TS 36.321 V8.2.0—Evolved Universal Terrestrial Radio Access (E-UTRA) Medium Access Control (MAC) protocol specification (Release 8)" 3rd Generation Partnership Project—Technical Specification Group Radio Access Network, 36.321, v8.2.0, May 1, 2008, pp. 1-33, XP002554077.

"3GPP TS 36.300 V8.5.0 (May 2008) 3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 8)" 3GPP TS 36.300 V8.5.0, May 1, 2008, pp. 1-134, XP002532523.

"3GPP TS 36.423 V0.1.0 (Jun. 2007) 3rd Generation Partnership Project; Technical Specification Group Radio Access Network; Evolved Universal Terrestrial Radio Access Network (E-UTRAN); X2 Application Protocol (X2AP); (Release 8)" XP007903964.

Specification Group Radio Access Network; Evolved Universal Terrestrial Radio Access (E-UTRA); Radio Resource Control (RRC); Protocol specification (Release 8) Jun. 9, 2008, pp. 1,2,12-29,67,68, XP002550516.

"3rd Generation Partnership Project; Technical Specification Group Radio Access Network; Physical layer procedures (FDD) (3G TS 25.214 version 8.2.0, May 2008)", XP0022557107.

Huawei: "Detection of conflicting cell identities" 3GPP Draft; R3-071947 Detection of Conflicting Cell Identities, 3rd Generation Partnership Project (3GPP), Mobile Competence Centre; 650, Roude Des Lucioles; F-06921 Sophia-Antipolis Cedex: France, RAN WG3, Oct. 3, 2007, XP050162733.

International Search Report and Written Opinion—PCT/US09/048318, International Search Authority—European Patent Office, May 11, 2010.

"LTE Handover procedures" 3rd Generation Partnership Project (3GPP); Technical Specification Group (TSG) Radio Access Network (RAN); Working Group 3 (WG3), R2-060951, Feb. 13, 2006, pp. 1-9, XP003012347.

Taiwan Search Report—TW098121026—TIPO—May 15, 2013.

3GPP: "3GPP TS 36.331 V8.2.0 (May 2008); 3rd Generation Partnership Project; Technical Specification Group Radio Access Network; Evolved Universal Terrestrial Radio Access (E-UTRA); Radio Resource Control (RRC); Protocol specification (Release 8)" Jun. 9, 2008, pp. 1,2,12-29,67,68, XP002550516.

Ericsson: "Automatic neighbour cell configuration" 3GPP Draft; S5-071484, 3rd Generation Partnership Project (3GPP), Mobile Competence Centre; Sophia-Antipolis Cedex ; France, (Aug. 2007), XP050306143, paragraph 3.4.

* cited by examiner

UTILIZING SYSTEM ACCESS SEQUENCES TO REQUEST RESOURCES FOR GCI REPORTING IN WIRELESS NETWORKS

CLAIM OF PRIORITY UNDER 35 U.S.C. §119

The present Application for Patent claims priority to Provisional Application No. 61/074,957 entitled "SYSTEMS AND METHODS TO ENABLE USE OF A RACH ACCESS SEQUENCE TO REQUEST UPLINK RESOURCES IN GCI REPORTING IN WIRELESS NETWORKS" filed Jun. 23, 2008, and assigned to the assignee hereof and hereby expressly incorporated by reference herein.

BACKGROUND

1. Field

The following description relates generally to wireless communications, and more particularly to uniquely identifying access points in heterogeneous network deployments.

2. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), and/or multi-carrier wireless specifications such as evolution data optimized (EV-DO), one or more revisions thereof, etc.

Generally, wireless multiple-access communication systems may simultaneously support communication for multiple mobile devices. Each mobile device may communicate with one or more access points (e.g., base stations) via transmissions on forward and reverse links. The forward link (or downlink) refers to the communication link from access points to mobile devices, and the reverse link (or uplink) refers to the communication link from mobile devices to access points. Further, communications between mobile devices and access points may be established via single-input single-output (SISO) systems, multiple-input single-output (MISO) systems, multiple-input multiple-output (MIMO) systems, and so forth. In addition, mobile devices can communicate with other mobile devices (and/or access points with other access points) in peer-to-peer wireless network configurations.

In heterogeneous network deployments, small scale access points, such as picocell or femtocell access points, can provide wireless network access within proximity of one or more macrocell access points (e.g., in a sector of the macrocell access point). Mobile devices can communicate with the macrocell access points and/or small scale access points and can reselect to disparate macrocell or small scale access points (e.g., handover communications to the disparate access points) when traveling over a coverage area based on a variety of considerations. During handover, a source access point can communicate with a target access point, according to a physical cell identifier (PCI) thereof, to facilitate handing over communications (e.g., context and/or other information). In heterogeneous deployments, however, it becomes increasingly possible that neighboring access points have similar PCIs. Where the source and/or target access point have the same PCI as a disparate in-range access point, confusion or conflict can result where the source access point communicates with the target access point during handover or otherwise.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with facilitating reporting global cell identifiers (GCI) for selected access points during handover or other procedures involving access points having potentially conflicting physical cell identifiers (PCI). In particular, a mobile device can report a GCI of one access point to another access point based at least in part on selecting a system access sequence. For example, where the mobile device requests system access from an access point using an access sequence from a specified group, this can indicate to the access point that the mobile device is going to provide GCI information related to a disparate access point in a subsequent message, for example. The access point can accordingly grant additional resources to the mobile device to provide the GCI. In a handover context, for example, the target access point can utilize the GCI to communicate directly with a source access point regardless of a potentially conflicted PCI of the target access point. Thus, in this example, PCI confusion is mitigated during handover.

According to related aspects, a method is provided that includes determining whether to transmit a GCI related to an access point to a disparate access point. The method also includes indicating reporting of GCI to the disparate access point as part of a system access request and transmitting the system access request to the disparate access point.

Another aspect relates to a wireless communications apparatus. The wireless communications apparatus can include at least one processor configured to indicate whether GCI reporting is requested for a source access point in a system access request and transmit the system access request to a target access point. The wireless communications apparatus also comprises a memory coupled to the at least one processor.

Yet another aspect relates to an apparatus that includes means for determining whether to report a global cell identifier (GCI) of an access point to a disparate access point and means for transmitting a system access request to the disparate access point comprising an indication of subsequent GCI reporting and receiving a system access response comprising a resource allocation.

Still another aspect relates to a computer program product, which can have a computer-readable medium including code for causing at least one computer to determine whether to transmit a GCI related to an access point to a disparate access point. The computer-readable medium can also comprise code for causing the at least one computer to indicate reporting of GCI to the disparate access point as part of a system access request. Moreover, the computer-readable medium can comprise code for causing the at least one computer to transmit the system access request to the disparate access point.

Moreover, an additional aspect relates to an apparatus. The apparatus can include a GCI determination component that discerns whether to report a GCI of an access point to a disparate access point. The apparatus further includes a system access component that transmits a system access request to the disparate access point comprising an indication of subsequent GCI reporting and receives a system access response comprising a resource allocation.

According to other aspects, a method is provided that includes exposing a set of access sequences for indicating subsequent reporting of a GCI of an access point based at least in part on a local type, type of the access point, or type of one or more disparate surrounding access points. The method further includes receiving a system access request from a mobile device comprising an access sequence and determining subsequent reporting of the GCI based at least in part on locating the access sequence in the set of access sequences.

Another aspect relates to a wireless communications apparatus. The wireless communications apparatus can include at least one processor configured to provide a set of access sequences corresponding to receiving subsequent GCI reporting from one or more mobile devices based at least in part on a local type or type of one or more disparate surrounding access points. The at least one processor is further configured to receive a system access request from a mobile device that includes an access sequence and discern whether GCI reporting is requested based at least in part on identifying the access sequence in the set of access sequences. The wireless communications apparatus also comprises a memory coupled to the at least one processor.

Yet another aspect relates to an apparatus that includes means for providing a set of access sequences related to indicating subsequent GCI reporting based at least in part on a local type or type of one or more disparate surrounding access points. The apparatus also includes means for obtaining an access request including an access sequence from a mobile device and granting resources to the mobile device for transmitting a GCI of an access point based at least in part on the access sequence.

Still another aspect relates to a computer program product, which can have a computer-readable medium including code for causing at least one computer to expose a set of access sequences for indicating subsequent reporting of a GCI of an access point based at least in part on a local type or type of one or more disparate surrounding access points. The computer-readable medium can also comprise code for causing the at least one computer to receive a system access request from a mobile device comprising an access sequence. Moreover, the computer-readable medium can comprise code for causing the at least one computer to determine subsequent reporting of the GCI based at least in part on locating the access sequence in the set of access sequences.

Moreover, an additional aspect relates to an apparatus. The apparatus can include an access sequence component that provides a set of access sequences related to indicating subsequent GCI reporting based at least in part on a local type or type of one or more disparate surrounding access points. The apparatus further includes an access request component that obtains an access request including an access sequence from a mobile device and grants resources to the mobile device for transmitting a GCI of an access point based at least in part on the access sequence.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed and this description is intended to include all such aspects and their equivalents.

DETAILED DESCRIPTION

Figure 1:
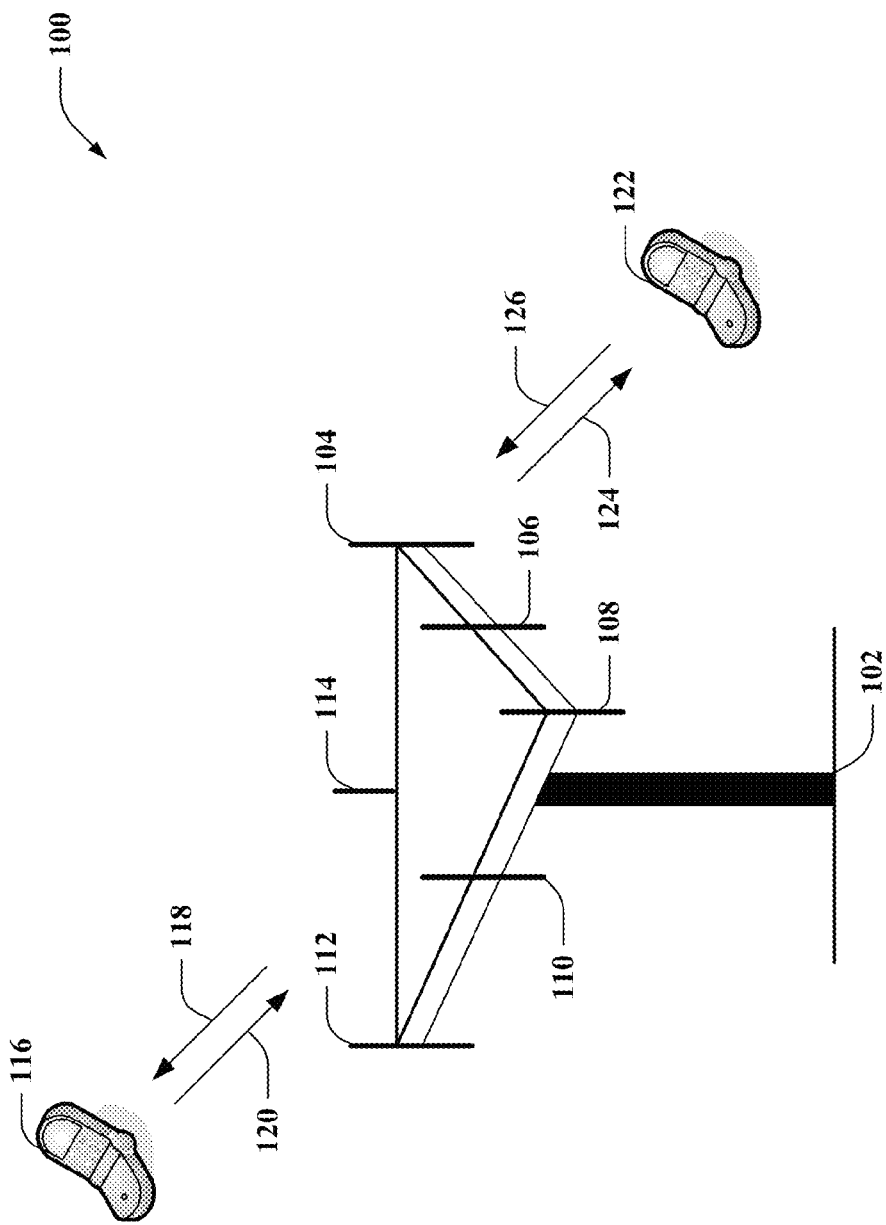
FIG. 1 is an illustration of a wireless communication system in accordance with various aspects set forth herein.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to mobile devices in a sector of the areas covered by base station 102. In communication over forward links 118 and 124, the transmitting antennas of base station 102 can utilize beamforming to improve signal-to-noise ratio of forward links 118 and 124 for mobile devices 116 and 122. Also, while base station 102 utilizes beamforming to transmit to mobile devices 116 and 122 scattered randomly through an associated coverage, mobile devices in neighboring cells can be subject to less interference as compared to a base station transmitting through a single antenna to all its mobile devices. Moreover, mobile devices 116 and 122 can communicate directly with one another using a peer-to-peer or ad hoc technology (not shown).

According to an example, system 100 can be a multiple-input multiple-output (MIMO) communication system. Further, system 100 can utilize substantially any type of duplexing technique to divide communication channels (e.g., forward link, reverse link, . . . ) such as FDD, FDM, TDD, TDM, CDM, and the like. In addition, communication channels can be orthogonalized to allow simultaneous communication with multiple devices over the channels; in one example, OFDM can be utilized in this regard. Thus, the channels can be divided into portions of frequency over a period of time. In addition, frames can be defined as the portions of frequency over a collection of time periods; thus, for example, a frame can comprise a number of OFDM symbols. The base station 102 can communicate to the mobile devices 116 and 122 over the channels, which can be created for various types of data. For example, channels can be created for communicating various types of general communication data, control data (e.g. quality information for other channels, acknowledgement indicators for data received over channels, interference information, reference signals, etc.), and/or the like.

In one example, the base station 102 can be a macrocell base station or a small scale access point (e.g., a femtocell access point, picocell access point, relay node, and/or the like). In either case, the base station 102 can provide a plurality of access sequences that the mobile devices 116 and/or 122 can utilize to initially connect to the base station 102. In an example, the mobile devices 116 and/or 122 can communicate information regarding a disparate base station (not shown) to the base station 102 upon initially connecting to the base station 102 (e.g., during handover or otherwise). In this regard, the mobile devices 116 and/or 122 and/or the disparate base station can determine whether to use a global cell identifier (GCI) or a physical cell identifier (PCI) in connection with the information to identify the disparate base station. This determination can be based on various factors, including but not limited to a type of the disparate base station, type of the base station 102, type of one or more surrounding base stations, explicit determination of PCIs of surrounding base stations, and/or the like (e.g. where the PCI may be confused with a PCI of a surrounding base station).

Communicating GCI instead of or in addition to PCI can require more resources than transmitting PCI alone. Thus, the mobile devices 116 and/or 122 can indicate, in a system access request to the base station 102, that they will transmit GCI in a subsequent communication. In one example, this can be indicated by a system access sequence chosen by the mobile devices 116 and/or 122, or a group with which the system access sequence is associated. It is to be appreciated, however, that the indication can additionally or alternatively correspond to a bit in the system access request or another message. Where the base station 102 grants the additional resources to the mobile devices 116 and/or 122 (e.g., in a system access response), the mobile devices 116 and/or 122 can accordingly transmit the GCI to the base station 102 (e.g. in a scheduled transmission or other message). Thus, the base station 102 can utilize the GCI to communicate with the disparate access point during or subsequent to an access procedure by the mobile devices 116 and/or 122, for example.

Figure 2:
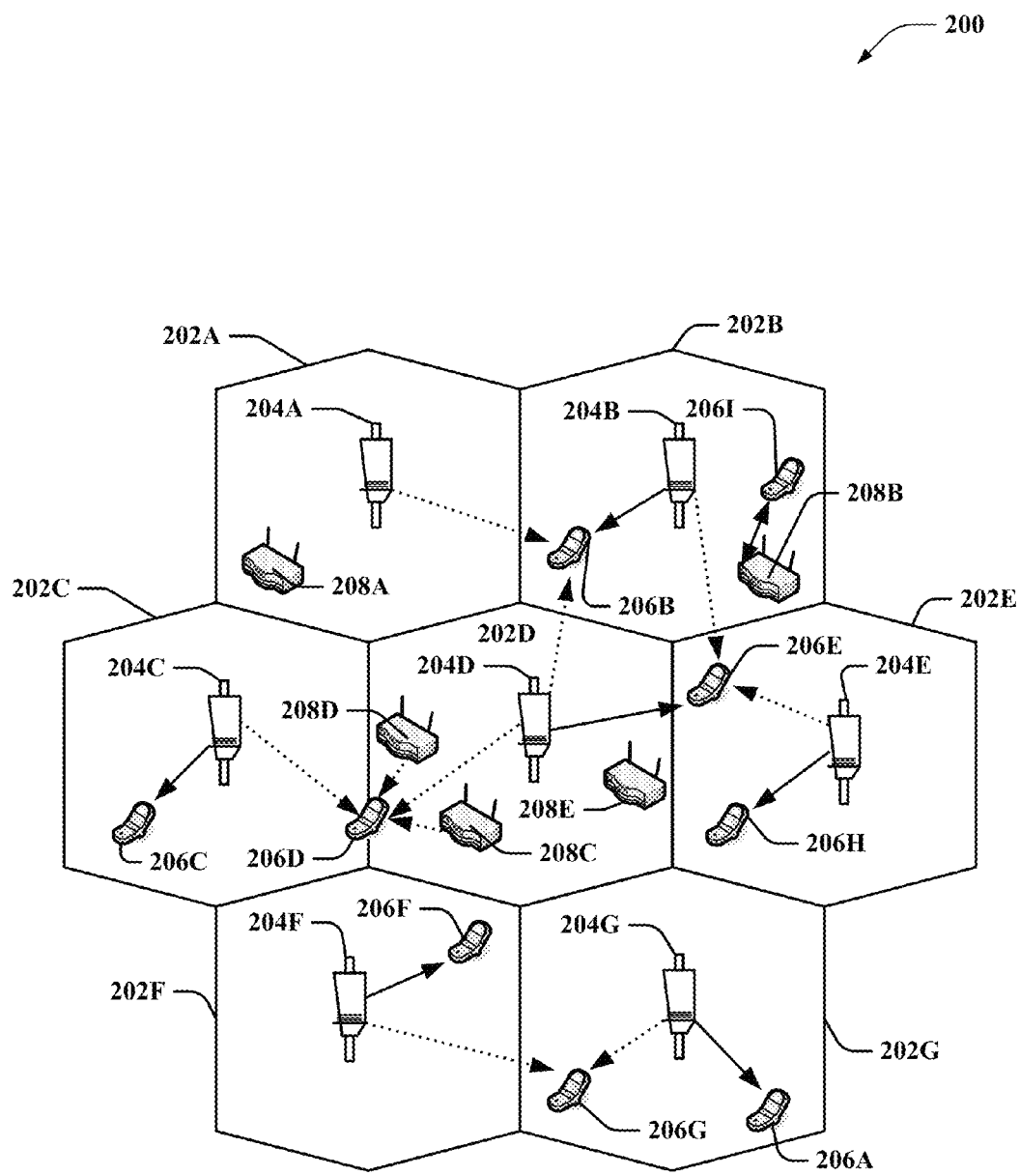
FIG. 2 is an illustration of a wireless communication network in accordance with aspects described herein.

Now referring to FIG. 2, a wireless communication system 200 configured to support a number of mobile devices is illustrated. The system 200 provides communication for multiple cells, such as for example, macrocells 202A-202G, with each cell being serviced by a corresponding access point 204A-204G. As described previously, for instance, the access points 204A-204G related to the macrocells 202A-202G can be base stations. Mobile devices 206A-206I are shown dispersed at various locations throughout the wireless communication system 200. Each mobile device 206A-206I can communicate with one or more access points 204A-204G on a forward link and/or a reverse link, as described. In addition, access points 208A-208E are shown. These can be small scale access points, such as femtocell access points, picocell access points, relay nodes, mobile base stations, and/or the like, offering services related to a particular service location, as described. The mobile devices 206A-206I can additionally or alternatively communicate with these small scale access points 208A-208E to receive offered services. The wireless communication system 200 can provide service over a large geographic region, in one example (e.g., macrocells 202A-202G can cover a few blocks in a neighborhood, and the small scale access points 208A-208E can be present in areas such as residences, office buildings, and/or the like as described). In an example, the mobile devices 206A-206I can establish connection with the access points 204A-204G and/or 208A-208E over the air and/or over a backhaul connection.

According to an example, mobile devices 206A-206I can travel throughout the wireless network and reselect cells provided by the various access points 204A-204G and 208A-208E. Handover can be performed for a variety of reasons, such as proximity to a target access point, services offered by a target access point, protocols or standards supported by a target access point, favorable billing associated with a target access point, etc. In an example, mobile device 206D can communicate with access point 204D and handover can be initiated to small scale access point 208C when within a specified proximity or measured signal strength thereof. To facilitate reselecting small scale access point 208C, the source access point 204D can transmit information to the target small scale access point 208C regarding the mobile device 206D, such as a context or other information relevant to continuing communications therewith. Thus, the target small scale access point 208C can provide wireless network access to the mobile device 206D based on the contextual information to facilitate seamless handover from the access point 204D.

In one example, the source access point 204D can communicate the contextual information to the target small scale access point 208C using a PCI thereof, which can be obtained from the mobile device 206D. In a deployment with multiple small scale access points, however, the PCI of the small scale access point 208D may not be unique. In this example, mobile device 206D can be communicating with small scale access point 208D and handing over to small scale access point 208C or macrocell access point 204D. Small scale access point 208D, however, can have the same or similar PCI as the small scale access point 208E causing confusion to the target small scale access point 208C or target macrocell access point 204D when communicating the contextual information. In this regard, mobile device 206D can provide GCI of the source small scale access point 208D to the target small scale access point 208C or macrocell access point 204D to mitigate PCI confusion during handover.

According to an example, the mobile device 206D can determine whether to provide the GCI to the target small scale access point 208C based at least in part on determining whether the source access point 208D and/or target access point 208C or 204D is a small scale access point (e.g., an access point that can cause PCI confusion). If so, the mobile device 206D can indicate that it will transmit GCI of the source access point 208D. In one example, this indication can correspond to an access sequence of the target small scale access point 208C or macrocell access point 204D selected by the mobile device 206D during a system access request, a bit specified by the mobile device 206D, and/or the like. Based on the indication, the target small scale access point 208C or macrocell access point 204D can allocate additional resources to the mobile device 206D to facilitate communicating the GCI, and the mobile device 206D can communicate the GCI in a subsequent scheduled transmission.

Using the GCI, the target small scale access point 208C or macrocell access point 204D can retrieve contextual mobile device information from the source access point 208D, for example. It is to be appreciated that the target small scale access point 208C or macrocell access point 204D can allow GCI reporting or not (e.g., provide a set of sequences for indicating reporting of GCI or provide no such sequences).

This can be based at least in part on a type of the access point 208C or 204D and/or disparate surrounding access points, in one example, evaluating PCIs of surrounding access points, and/or the like. For instance, if the target access point is a macrocell access point, GCI reporting may not need to be supported as the macrocell access point PCI is likely not confused with neighboring macrocell access points; however, for example, a small number of GCI reporting access sequences can be supported by the macrocell access point for communicating with a small scale access point, which can have confusing PCIs, during handover.

Figure 3:
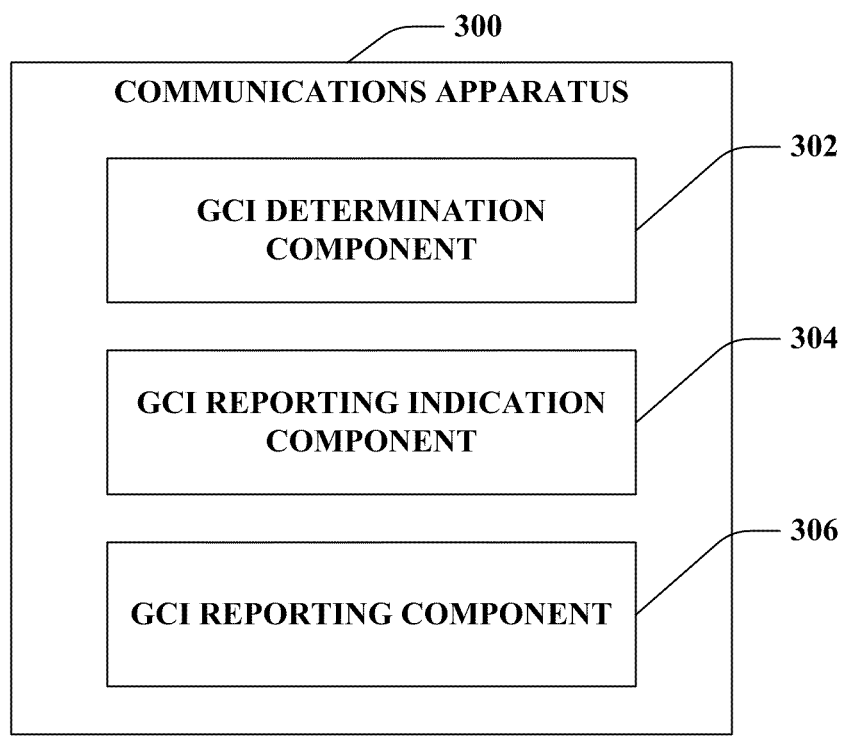
FIG. 3 is an illustration of an example communications apparatus for employment within a wireless communications environment.

Turning to FIG. 3, illustrated is a communications apparatus 300 for employment within a wireless communications environment. The communications apparatus 300 can be a mobile device or a portion thereof, or substantially any communications apparatus that receives access to a wireless network. The communications apparatus 300 includes a GCI determination component 302 that can discern whether GCI of an access point (not shown) should be reported when communicating with a disparate access point (not shown), a GCI reporting indication component 304 that can indicate subsequent reporting of GCI, and a GCI reporting component 306 that can report GCI.

According to an example, the communications apparatus 300 can initialize communication with an access point (e.g. as part of handover or otherwise). Upon or prior to initializing communication with a current access point, the GCI determination component 302 can decide whether to include a GCI of a previous access point when requesting access to the current access point. In one example, the previous access point can be a source access point in handover and the current access point can be a target access point; thus, the GCI determination component 302 can discern whether to include the GCI of the source access point to facilitate communicating contextual information about the communications apparatus 300, as described previously.

The GCI determination component 302 can decide whether to include the GCI of the previous access point based at least in part on a type of the previous access point, type of the current access point, type(s) of surrounding access points, network activity or traffic, system access sequences supported, etc. If the GCI determination component 302 specifies that GCI should be reported, the GCI reporting indication component 304 can indicate this to the current access point (e.g., as part of a system access request or other communication initialization message). Notifying the current access point can be desirable since transmitting GCI can require more resources allocated to the communications apparatus 300. In one example, this can be an explicit or implicit indication; in the latter example, GCI reporting can be specified by the GCI reporting indication component 304, and inferred by the current access point, based on a system access sequence chosen for requesting system access to the current access point. In addition, the GCI reporting indication component 304 can receive resources for transmitting the GCI, and the GCI reporting component 306, in one example, can accordingly transmit the GCI over the resources to the current access point.

Figure 4:
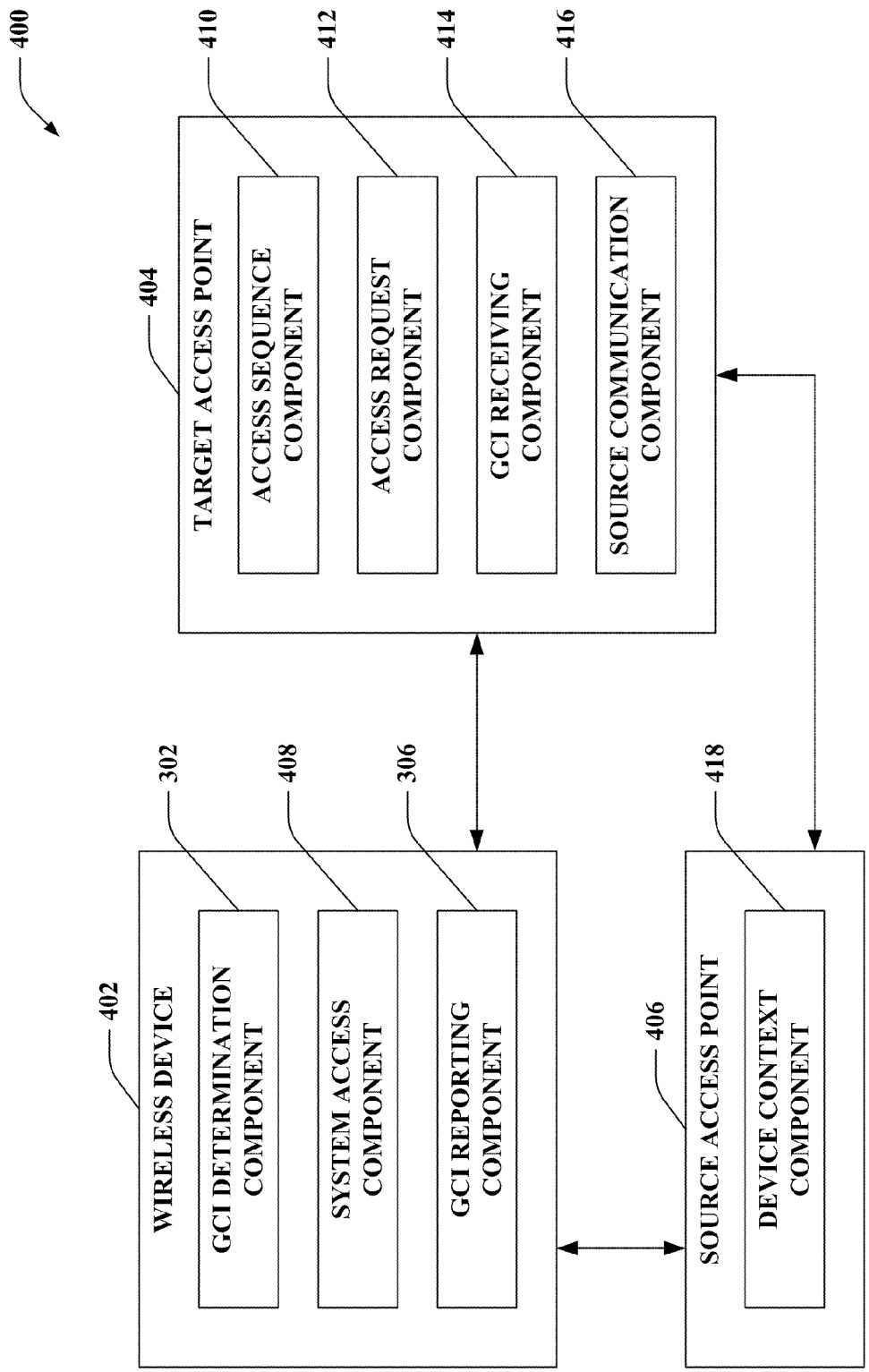
FIG. 4 is an illustration of an example wireless communications system that effectuates indicating GCI reporting.

Now referring to FIG. 4, illustrated is a wireless communications system 400 that facilitates reporting GCIs of access points when communicating with disparate access points to mitigate PCI confusion. Wireless device 402 can be a mobile device (including not only independently powered devices, but also modems, for example), a base station, and/or portion thereof, or substantially any wireless device. Target access point 404 and source access point 406 can be base stations, femtocell access points, picocell access points, relay nodes, and/or the like. Moreover, system 400 can be a MIMO system and/or can conform to one or more wireless network system specifications (e.g., EV-DO, 3GPP, 3GPP2, 3GPP LTE, WiMAX, etc.) and can comprise additional components to facilitate communication between the wireless device 402 and access points 404 and 406.

The wireless device 402 can communicate with the source access point 406 to receive wireless network access and handover can be initiated to the target access point 404, in one example. The wireless device 402 can include a GCI determination component 302 that resolves whether to report a GCI of a source access point to a target access point during handover, a system access component 408 that requests system access from the target access point and specifies whether it is reporting GCI of the source access point if applicable, and a GCI reporting component 306 that transmits GCI of the source access point to the target access point.

The target access point 404 can include an access sequence component 410 that specifies a set of system access sequences, which can be utilized for initializing communication with the target access point 404, an access request component 412 that can receive an access sequence from a wireless device and allocate resources according to the sequence, a GCI receiving component 414 that can obtain GCI of a source access point from the wireless device during handover, and a source communication component 416 that can correspond with the source access point using the GCI. In addition, the source access point 406 can include a device context component 418 that communicates contextual information about a wireless device to a target access point to facilitate handover.

According to an example, as mentioned, handover for the wireless device 402 can be initiated from the source access point 406 to the target access point 404, which can occur for various reasons, such as location with respect to the access points 404 and 406, services offered by the access points, billing, service provider of the access points 404 and 406, access point type, etc. The GCI determination component 302 can discern whether to report GCI of the source access point 406 to the target access point 404 to mitigate PCI confusion in handover, as described. For example, the GCI determination component 302 can decide whether to report the GCI based on a type of the source access point 406 and/or a type of the target access point 404. Where one of the access points 404 or 406 is of a type subject to PCI confusion (e.g., a femtocell or picocell access point), the GCI determination component 302 can specify GCI reporting. The determination can be made on additional or alternative factors as well, such as types of other surrounding access points, noise level of network devices or access points at the location of the wireless device 402, explicit PCIs of surrounding access points, and/or the like.

In addition, it is to be appreciated that the source access point 406 and/or target access point 404 can, in other examples, request or demand that the wireless device 402 specify GCI for the source access point 406, and/or the GCI determination component 302 can indicate GCI reporting according to a network specification, configuration, over-the-air signaling, etc. The access sequence component 410 can provide access sequences that can be utilized to establish communication with the target access point 404. In one example, the access sequence component 410 can implement grouping of sequences such that some sequences can be used to indicate additional information to the target access point 404. For example, in LTE, the access sequence component 410 can provide group A and group B access sequences where selecting group B indicates a request for more resources than a group A access sequence. In an example, the access sequence component 410 can expose or otherwise indicate available sequences to the wireless device 402; in addition, the access sequences can be known to both the target access point 404 and wireless device 402 according to a network specification, configuration, and/or the like.

The system access component 408 can select an access sequence for establishing communications with the target access point 404 according to whether GCI is to be reported, as discerned by the GCI determination component 302, for instance. In another example, the wireless device 402 can compute resources needed to report the GCI and accordingly select an access sequence. In one example, the system access component 408 can select a group B access sequence where GCI is to be reported; in this regard, the group B access sequence allows the wireless device 402 to transmit the GCI, which can require more resources than allowed with respect to a group A sequence. The access request component 412 can receive the system access sequence from the system access component 408 and grant transmission resources to the wireless device 402 according to the chosen sequence. The access request component 412 can also determine whether GCI is going to be reported based at least in part on the access sequence chosen. In another example, the system access component 408 can initialize a bit in a system access request indicating that it is sending GCI in a subsequent message or utilize substantially any notification of reporting GCI, and the access request component 412 can accordingly grant resources that facilitate such reporting. The GCI reporting component 306 can subsequently transmit GCI of the source access point 406 (e.g., which can be known to the wireless device 402 from previous communications) using the granted transmission resources, and the GCI receiving component 414 can receive the GCI.

The source communication component 416 can communicate with the source access point 406 using the GCI to receive information regarding the wireless device 402 to facilitate reselecting to the target access point 404. In an example, the device context component 418 can provide wireless device information to the target access point 404 to facilitate continuing communication with the wireless device 402. Thus, PCI confusion is mitigated during handover by allowing the wireless device 402 to specify GCI of the source access point 406 to the target access point 404 in system access procedures to facilitate subsequent communication between the target access point 404 and source access point 406.

Moreover, the access sequence component 410 can determine access sequences to implement and offer for establishing connection with the target access point 404. In one example, where the target access point 404 is a macrocell access point, the access sequence component 410 may not offer as many group B (or extended resource) sequences as a femtocell access point since it will likely be more highly utilized by various devices than a femtocell access point. In addition, however, if the target access point 404 is a macrocell access point with many femtocell access points present in a related cell, the access sequence component 410 may determine to provide more group B (or extended resource) access sequences to accommodate handover using GCI from the many femtocell access points, which can likely have conflicting PCIs, for example.

Figure 5:
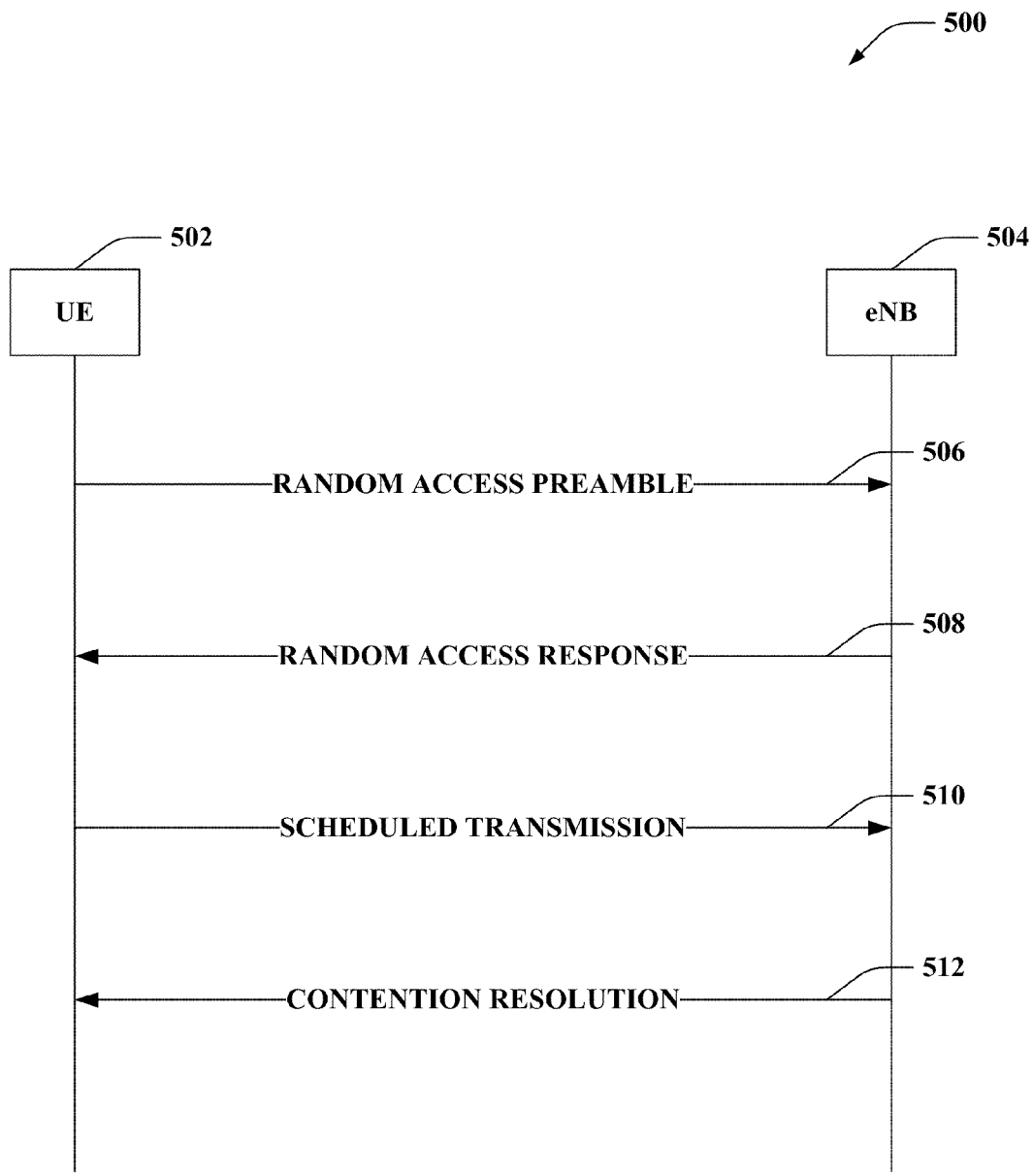
FIG. 5 is an illustration of an example system that facilitates indicating GCI reporting in a system access procedure.

Turning to FIG. 5, an example system 500 is shown that facilitates requesting access to a wireless network (e.g., in handover or otherwise), as described above. A UE 502 is shown that communicates with an eNB 504 to request wireless network access. In particular, the UE 502 can transmit a random access preamble 506 to the eNB. As described, the random access preamble 506 can comprise a bit indicating whether GCI of a source or other eNB will be reported in a subsequent message. In another example, as described, the random access preamble 506 can specify or be related to a system access sequence, selection of which can indicate whether GCI will subsequently be transmitted by the UE 502.

Upon receiving the random access preamble 506, the eNB 504 can determine whether to grant requested resources to the UE 502, and send a random access response 508 to the UE 502. If the random access response 508 includes a resource grant, the UE 502 can transmit a scheduled transmission 510 to the eNB. The scheduled transmission 510 can include the GCI if reporting was indicated and appropriate resources were received. Thus, the eNB 504 can receive the GCI in the scheduled transmission 510 and use the GCI communicate with a source (or other) access point to receive information regarding the UE 502. At 512, a contention resolution message 512 can be sent to the UE 502 to complete the access procedure.

Figure 6:
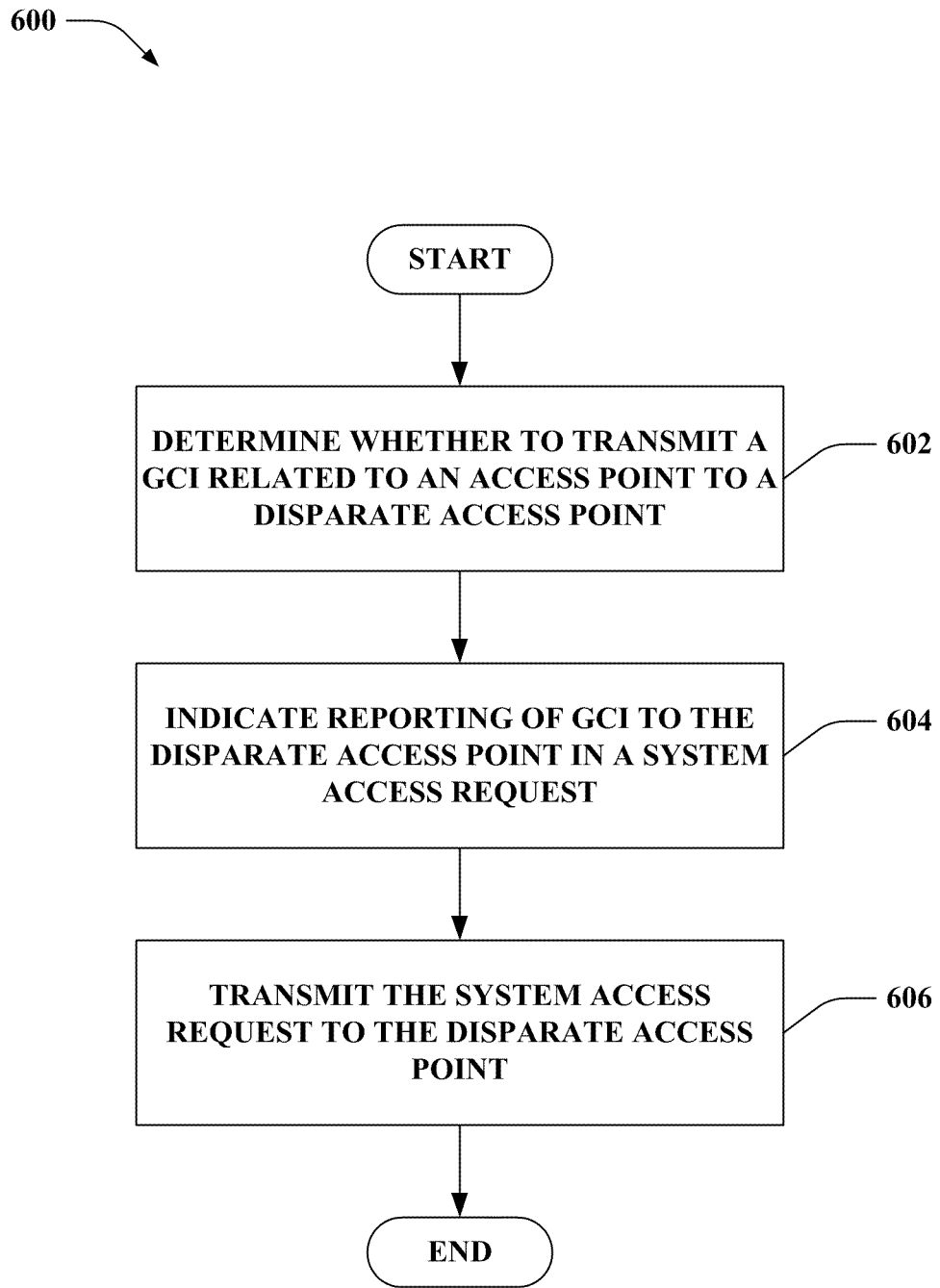
FIG. 6 is an illustration of an example methodology that indicates GCI reporting in a subsequent transmission.
Figure 7:
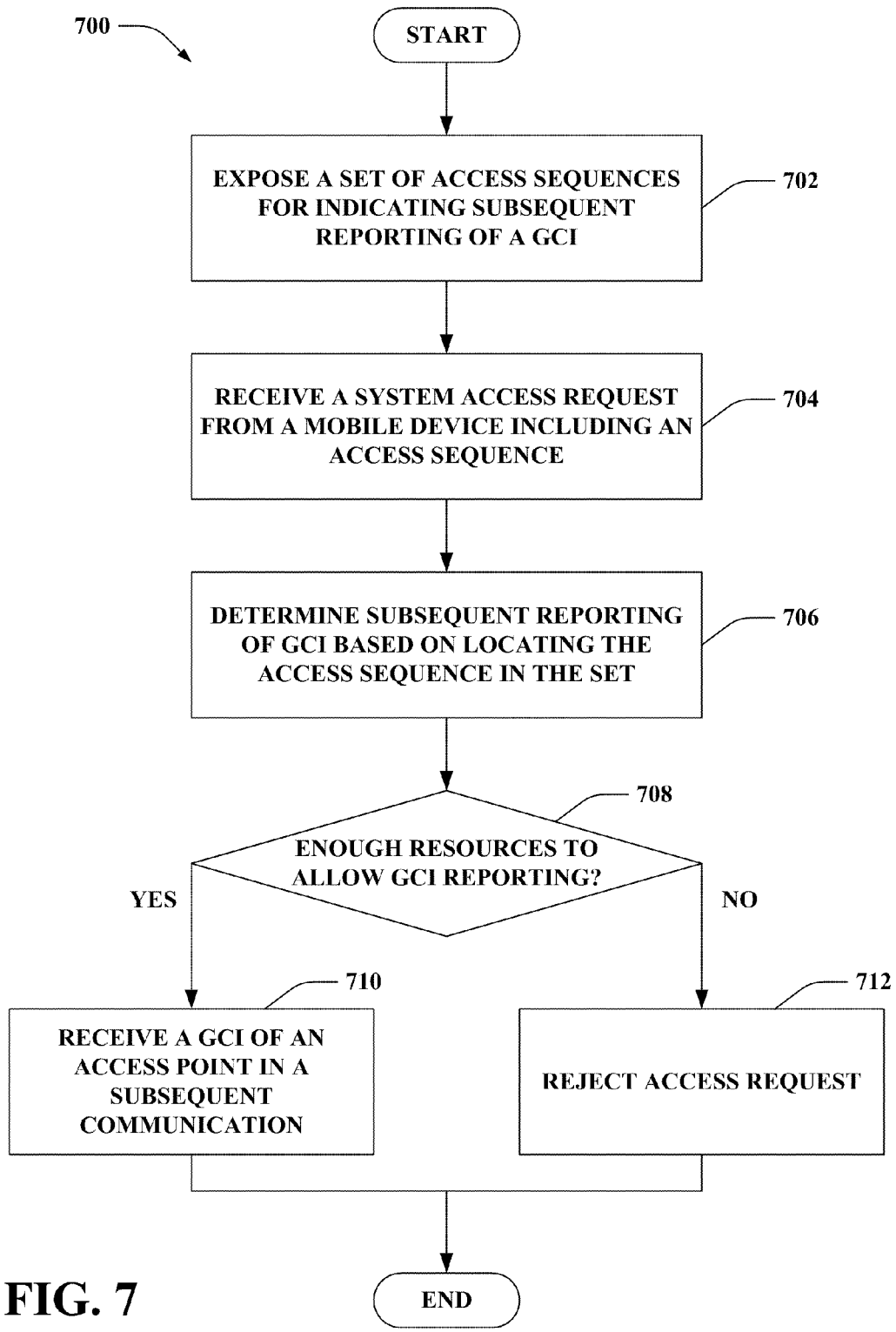
FIG. 7 is an illustration of an example methodology that provides resources for reporting GCI in subsequent transmissions.

Referring to FIGS. 6-7, methodologies relating to indicating GCI reporting in system access requests are illustrated. While, for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Turning to FIG. 6, an example methodology 600 that facilitates indicating reporting of GCI to an access point is illustrated. At 602, it can be determined whether to transmit a GCI related to an access point to a disparate access point. For example, where PCI confusion is likely, GCI can be reported to the disparate access point instead of PCI to enhance communications with the access point. Likelihood of confusion can be determined, as described, based on types of the access points and/or one or more surrounding access points. At 604, reporting of GCI to the disparate access point can be indicated in a system access request. As described, reporting of GCI can be explicitly indicated in a bit, according to a selected access sequence, and/or the like. At 606, the system access request can be transmitted to the disparate access point. Thus, the disparate access point, as described, can utilize the GCI to communicate with the access point without confusion that can be caused by using PCI, as described.

Referring to FIG. 7, an example methodology 700 is shown that facilitates providing access sequences that allow for specification of subsequent GCI reporting. At 702, a set of access sequences for indicating subsequent reporting of a GCI can be exposed such that one or more mobile devices can select a sequence according to whether it will send a GCI. At 704, a system access request can be received from a mobile device that includes an access sequence. According to an example, as described, the exposed access sequences can be grouped such that one group relates to specifying additional information requiring larger resource allocation. At 706, subsequent reporting of GCI can be determined based on locating the access sequence in the set of access sequences. Thus, for example, where the received access sequence is in the group for transmitting GCI or additional information (e.g. group B), subsequent GCI reporting can be expected. At 708, it can be determined whether there are enough resources to allow GCI reporting. If so, then at 710, a GCI of an access point can be received in a subsequent communication from the mobile device. If not, then the access request can be rejected at 712.

It will be appreciated that, in accordance with one or more aspects described herein, inferences can be made regarding determining whether GCI should be reported, determining whether GCI will be reported, determining an indication for reporting subsequent GCI, and/or the like. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 8:
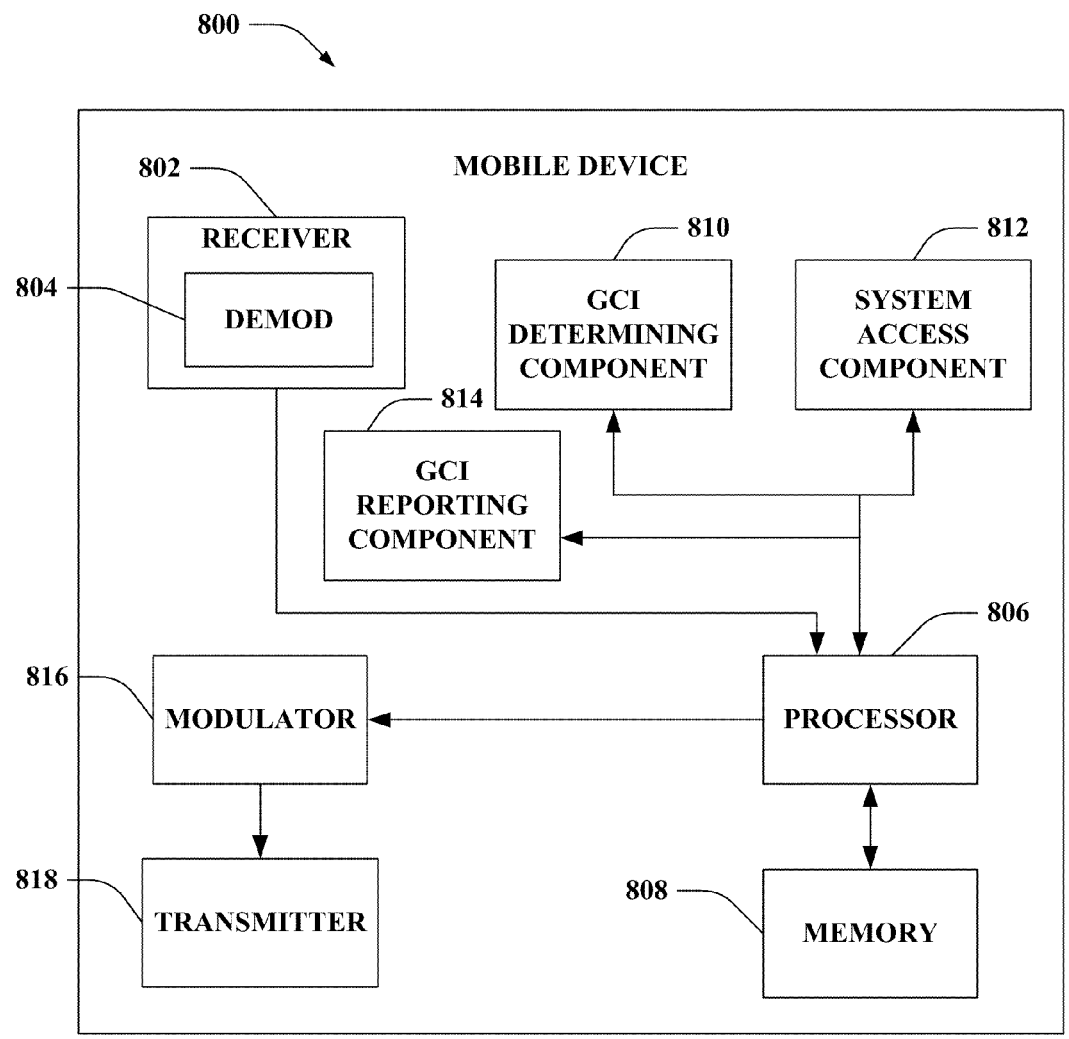
FIG. 8 is an illustration of an example mobile device that requests system access and GCI reporting.

FIG. 8 is an illustration of a mobile device 800 that facilitates indicating GCI reporting in a system access request. Mobile device 800 comprises a receiver 802 that receives one or more signals over one or more carriers from, for instance, a receive antenna (not shown), performs typical actions on (e.g., filters, amplifies, downconverts, etc.) the received signals, and digitizes the conditioned signals to obtain samples. Receiver 802 can comprise a demodulator 804 that can demodulate received symbols and provide them to a processor 806 for channel estimation. Processor 806 can be a processor dedicated to analyzing information received by receiver 802 and/or generating information for transmission by a transmitter 818, a processor that controls one or more components of mobile device 800, and/or a processor that both analyzes information received by receiver 802, generates information for transmission by transmitter 818, and controls one or more components of mobile device 800.

Mobile device 800 can additionally comprise memory 808 that is operatively coupled to processor 806 and that can store data to be transmitted, received data, information related to available channels, data associated with analyzed signal and/or interference strength, information related to an assigned channel, power, rate, or the like, and any other suitable information for estimating a channel and communicating via the channel. Memory 808 can additionally store protocols and/or algorithms associated with estimating and/or utilizing a channel (e.g., performance based, capacity based, etc.).

It will be appreciated that the data store (e.g., memory 808) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 808 of the subject systems and methods is intended to comprise, without being limited to, these and any other suitable types of memory.

Processor 806 can further be operatively coupled to a GCI determining component 810 that discerns whether to report GCI to an access point. The GCI determining component 810 can ascertain a type of a target access point, source access point, or one or more surrounding access points, as described, to decide whether to report GCI of the source access point. Processor 806 can further be operatively coupled to a system access component 812 that can transmit a system access request to the target access point comprising an indication of GCI reporting. As described, the indication can include a bit in the access request, an implicit indication based on an access sequence selected by the system access component 812, and/or the like. The system access component 812 can also receive resources from the target access point for establishing communication and/or specifying the GCI, if indicated in the system access request.

In addition, the processor 806 can be operatively coupled to a GCI reporting component 814 that subsequently reports GCI over the allocated resources. Mobile device 800 still further comprises a modulator 816 and transmitter 818 that respectively modulate and transmit signals to, for instance, a base station, another mobile device, etc. Although depicted as being separate from the processor 806, it is to be appreciated that the demodulator 804, GCI determining component 810, system access component 812, GCI reporting component 814, and/or modulator 816 can be part of the processor 806 or multiple processors (not shown).

Figure 9:
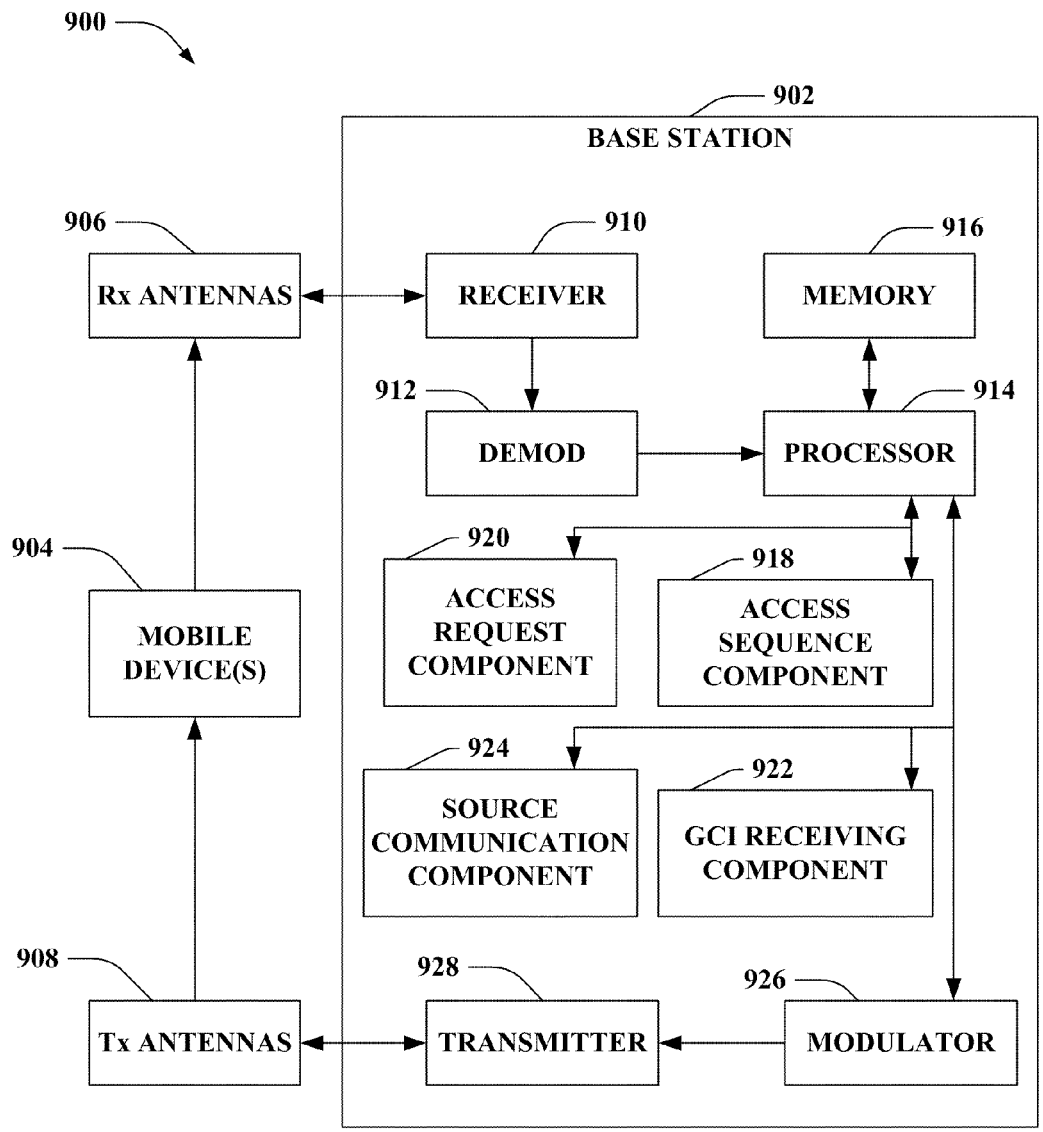
FIG. 9 is an illustration of an example system that provides system access resources for indicating GCI.

FIG. 9 is an illustration of a system 900 that facilitates receiving GCIs and related indication of GCI reporting from mobile devices. The system 900 comprises a base station 902 (e.g., access point, . . . ) with a receiver 910 that receives signal(s) from one or more mobile devices 904 through a plurality of receive antennas 906, and a transmitter 928 that transmits to the one or more mobile devices 904 through a transmit antenna 908. Receiver 910 can receive information from receive antennas 906 and is operatively associated with a descrambler that can decode received signals. Furthermore, demodulator 912 can demodulate received descrambled signals. Demodulated symbols are analyzed by a processor 914 that can be similar to the processor described above with regard to FIG. 8, and which is coupled to a memory 916 that stores information related to estimating a signal (e.g. pilot) strength and/or interference strength, data to be transmitted to or received from mobile device(s) 904 (or a disparate base station (not shown)), and/or any other suitable information related to performing the various actions and functions set forth herein.

Processor 914 is further coupled to an access sequence component 918 that can expose a number of access sequences, at least a portion of which can be designated to allocate resources for sending GCI or other additional data, an access request component 920 that can receiving access requests and allocate resources based on the requests, a GCI receiving component 922 that can obtain GCIs of disparate access points, and a source communication component 924 that can receive information from disparate access points by utilizing the GCI to facilitate communicating therewith.

According to an example, mobile device(s) 904 can select an access sequence exposed by the access sequence component 918 for establishing communication with the base station 902. The access request component 920 can receive an access request from the mobile device(s) 904 comprising the access sequence. Based on the access sequence, the access request component 920 can allocate resources to the mobile device(s) 904 to facilitate communicating therewith (e.g., if the access sequence explicitly or implicitly indicates GCI reporting, the access request component 920 can allocate sufficient resources for subsequently receiving the GCI). In this regard, the GCI receiving component 922 can obtain the GCI for a source access point (not shown), and the source communication component 924 can transmit/receive data to/from the source access point using the GCI. In this regard, PCI confusion can be mitigated as the GCI is utilized for communicating with the source access point. Furthermore, although depicted as being separate from the processor 914, it is to be appreciated that the demodulator 912, access sequence component 918, access request component 920, GCI receiving component 922, source communication component 924, and/or modulator 926 can be part of the processor 914 or multiple processors (not shown).

Figure 10:
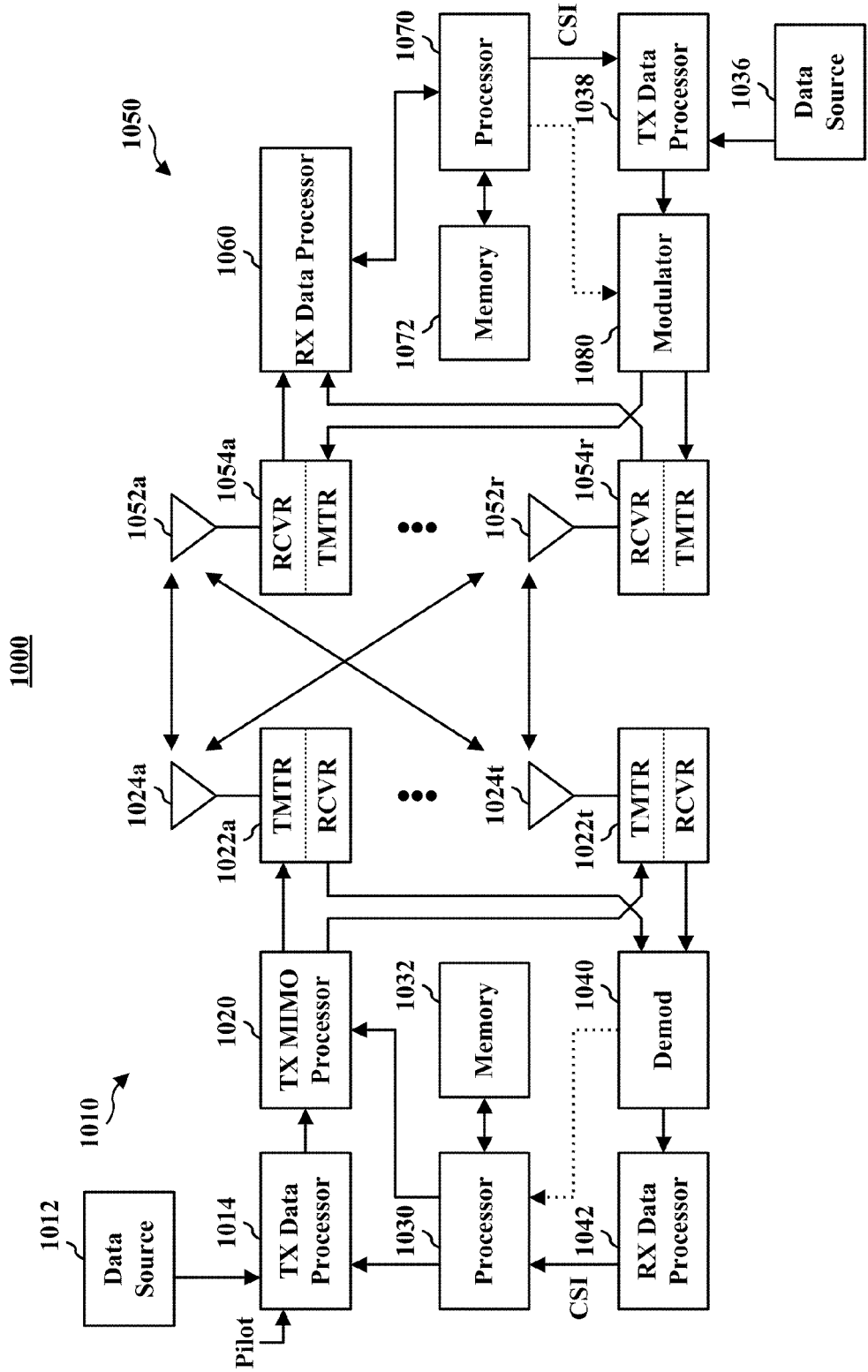
FIG. 10 is an illustration of an example wireless network environment that can be employed in conjunction with the various systems and methods described herein.

FIG. 10 shows an example wireless communication system 1000. The wireless communication system 1000 depicts one base station 1010 and one mobile device 1050 for sake of brevity. However, it is to be appreciated that system 1000 can include more than one base station and/or more than one mobile device, wherein additional base stations and/or mobile devices can be substantially similar or different from example base station 1010 and mobile device 1050 described below. In addition, it is to be appreciated that base station 1010 and/or mobile device 1050 can employ the systems (FIGS. 1-4 and 8-9), configurations (FIG. 5), and/or methods (FIGS. 6-7) described herein to facilitate wireless communication there between.

At base station 1010, traffic data for a number of data streams is provided from a data source 1012 to a transmit (TX) data processor 1014. According to an example, each data stream can be transmitted over a respective antenna. TX data processor 1014 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1050 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1030.

The modulation symbols for the data streams can be provided to a TX MIMO processor 1020, which can further process the modulation symbols (e.g., for OFDM). TX MIMO processor 1020 then provides $N_T$ modulation symbol streams to $N_T$ transmitters (TMTR) 1022a through 1022t. In various aspects, TX MIMO processor 1020 applies beamforming weights to the symbols of the data streams and to the antenna from which the symbol is being transmitted.

Each transmitter 1022 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1022a through 1022t are transmitted from $N_T$ antennas 1024a through 1024t, respectively.

At mobile device 1050, the transmitted modulated signals are received by $N_R$ antennas 1052a through 1052r and the received signal from each antenna 1052 is provided to a respective receiver (RCVR) 1054a through 1054r. Each receiver 1054 conditions (e.g., filters, amplifies, and downconverts) a respective signal, digitizes the conditioned signal to provide samples, and further processes the samples to provide a corresponding "received" symbol stream.

An RX data processor 1060 can receive and process the $N_R$ received symbol streams from $N_R$ receivers 1054 based on a particular receiver processing technique to provide $N_T$ "detected" symbol streams. RX data processor 1060 can demodulate, deinterleave, and decode each detected symbol stream to recover the traffic data for the data stream. The processing by RX data processor 1060 is complementary to that performed by TX MIMO processor 1020 and TX data processor 1014 at base station 1010.

A processor 1070 can periodically determine which preceding matrix to utilize as discussed above. Further, processor 1070 can formulate a reverse link message comprising a matrix index portion and a rank value portion.

The reverse link message can comprise various types of information regarding the communication link and/or the received data stream. The reverse link message can be processed by a TX data processor 1038, which also receives traffic data for a number of data streams from a data source 1036, modulated by a modulator 1080, conditioned by transmitters 1054a through 1054r, and transmitted back to base station 1010.

At base station 1010, the modulated signals from mobile device 1050 are received by antennas 1024, conditioned by receivers 1022, demodulated by a demodulator 1040, and processed by a RX data processor 1042 to extract the reverse link message transmitted by mobile device 1050. Further, processor 1030 can process the extracted message to determine which preceding matrix to use for determining the beamforming weights.

Processors 1030 and 1070 can direct (e.g., control, coordinate, manage, etc.) operation at base station 1010 and mobile device 1050, respectively. Respective processors 1030 and 1070 can be associated with memory 1032 and 1072 that store program codes and data. Processors 1030 and 1070 can also perform computations to derive frequency and impulse response estimates for the uplink and downlink, respectively.

It is to be understood that the aspects described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the aspects are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 11:
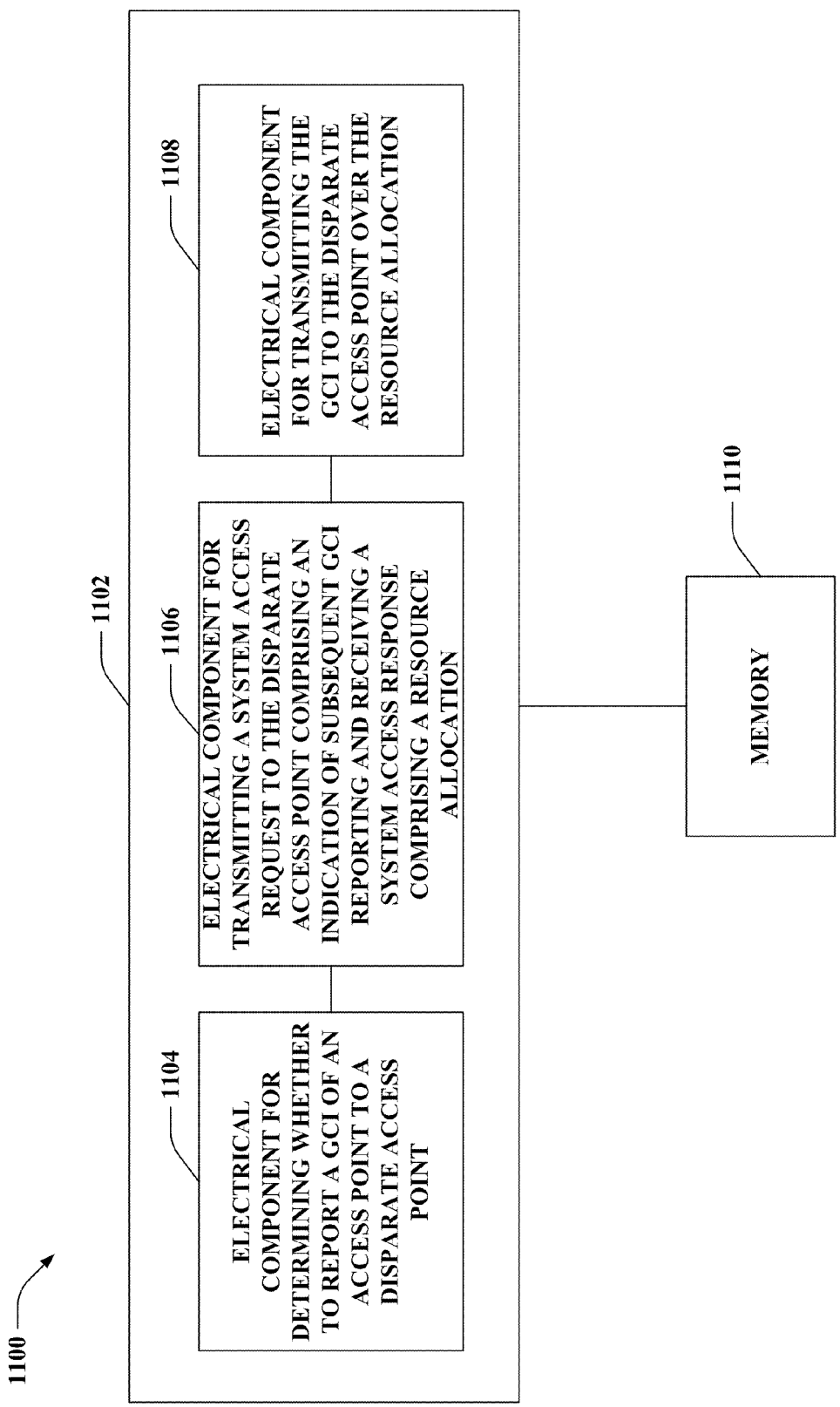
FIG. 11 is an illustration of an example system that indicates GCI reporting and subsequent GCI transmission.

With reference to FIG. 11, illustrated is a system 1100 that facilitates notification of subsequent access point GCI reporting in wireless communications. For example, system 1100 can reside at least partially within a base station, mobile device, etc. It is to be appreciated that system 1100 is represented as including functional blocks, which can be functional blocks that represent functions implemented by a processor, software, or combination thereof (e.g., firmware). System 1100 includes a logical grouping 1102 of electrical components that can act in conjunction. For instance, logical grouping 1102 can include an electrical component for determining whether to report a GCI of an access point to a disparate access point 1104. For example, as described, indicating GCI reporting can be determined based at least in part on a type of the access point, disparate access point, other surrounding access points, and/or the like. For example, where the access point is a small scale access point, subsequent GCI reporting may be indicated by the electrical component 1104 to mitigate PCI confusion caused by other surrounding access points.

In addition, logical grouping 1102 can include an electrical component for transmitting a system access request to the disparate access point comprising an indication of subsequent GCI reporting and receiving a system access response comprising a resource allocation 1106. Thus, as described, GCI reporting can be indicated explicitly, implicitly (e.g. based on a selected access sequence), etc., and resources can be accordingly allocated for transmitting the GCI or not. In this regard, logical grouping 1102 can include an electrical component for transmitting the GCI to the disparate access point over the resource allocation 1108. Additionally, system 1100 can include a memory 1110 that retains instructions for executing functions associated with electrical components 1104, 1106, and 1108. While shown as being external to memory 1110, it is to be understood that one or more of electrical components 1104, 1106, and 1108 can exist within memory 1110.

Figure 12:
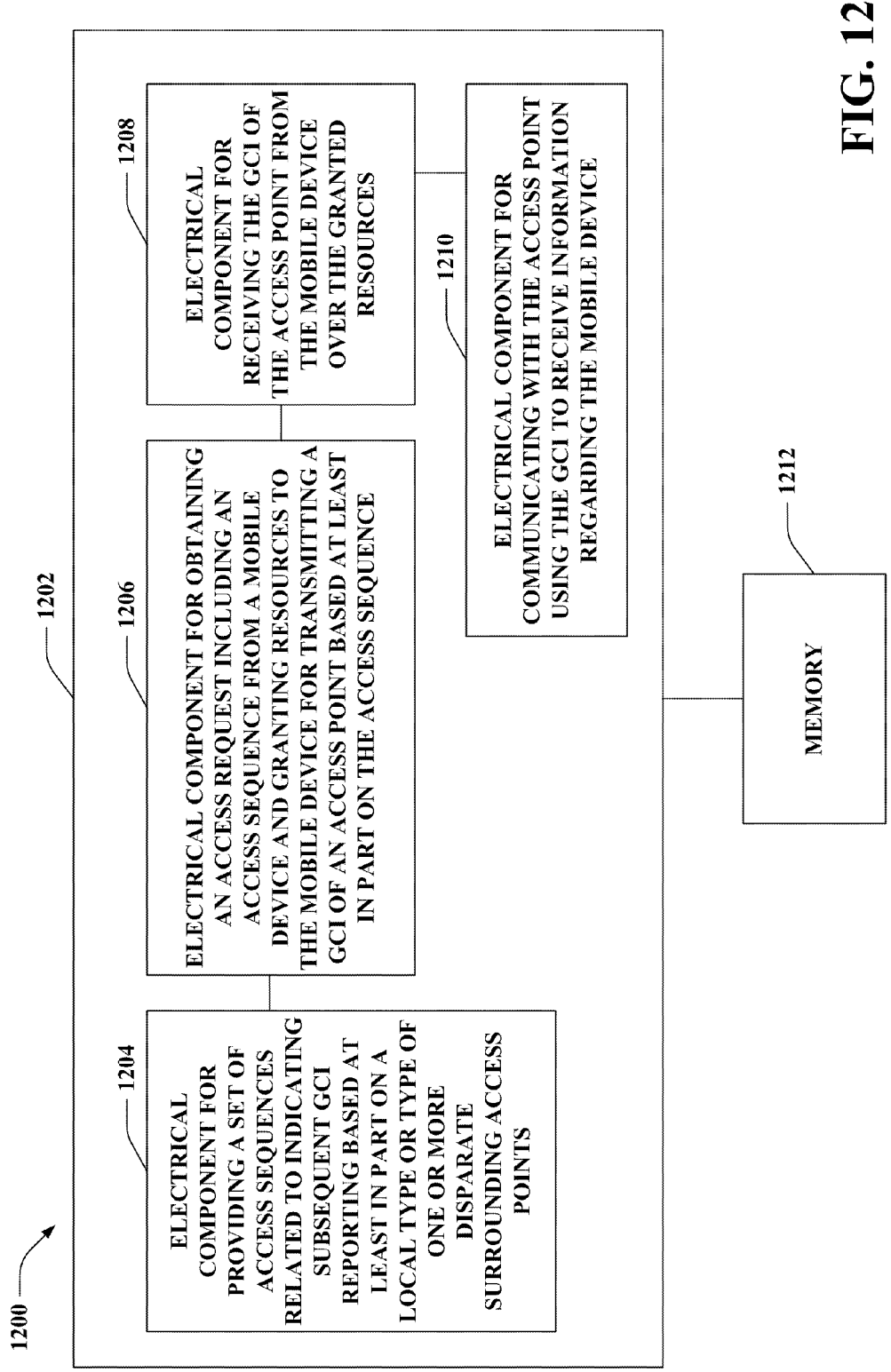
FIG. 12 is an illustration of an example system that receives GCI over allocated resources.

With reference to FIG. 12, illustrated is a system 1200 that receives GCIs and related indications from mobile devices. For example, system 1200 can reside at least partially within a base station, mobile device, etc. It is to be appreciated that system 1200 is represented as including functional blocks, which can be functional blocks that represent functions implemented by a processor, software, or combination thereof (e.g., firmware). System 1200 includes a logical grouping 1202 of electrical components that can act in conjunction. For instance, logical grouping 1202 can include an electrical component for providing a set of access sequences related to indicating subsequent GCI reporting based at least in part on a local type or type of one or more disparate surrounding access points 1204. As described, the set of access sequences can differentiate between regular access sequences and those that allow GCI reporting or transmission of other information.

Furthermore, logical grouping 1202 can include an electrical component for obtaining an access request including an access sequence from a mobile device and granting resources to the mobile device for transmitting a GCI of an access point based at least in part on the access sequence 1206. Thus, as described, based on the sequence, additional resources can be granted for GCI reporting. Moreover, logical grouping 1202 can include an electrical component for receiving the GCI of the access point from the mobile device over the granted resources 1208. Logical grouping 1202 can also include an electrical component for communicating with the access point using the GCI to receive information regarding the mobile device 1210. Thus, information can be received using GCI, mitigating confusion caused by using PCI, as described. Additionally, system 1200 can include a memory 1212 that retains instructions for executing functions associated with electrical components 1204, 1206, 1208, and 1210. While shown as being external to memory 1212, it is to be understood that one or more of electrical components 1204, 1206, 1208, and 1210 can exist within memory 1212.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Furthermore, to the extent that the term "includes" is used in either the detailed description or the claims, such term is intended to be inclusive in a manner similar to the term "comprising" as "comprising" is interpreted when employed as a transitional word in a claim. Furthermore, although elements of the described aspects and/or aspects may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method, comprising:
    receiving a set of access sequences for indicating subsequent reporting of a global cell identifier of a first access point;
    determining whether to transmit either the global cell identifier or a physical cell identifier related to the first access point to a second access point, the global cell identifier requiring more resources for transmission than the physical cell identifier;
    indicating reporting of the global cell identifier to the second access point by selecting an access sequence from the set of access sequences for inclusion as part of a system access request; and
    transmitting the system access request to the second access point.

2. The method of claim 1, wherein selecting the access sequence includes computing a data size required for transmitting the global cell identifier.

3. The method of claim 1, wherein indicating reporting of the global cell identifier comprises initializing a bit in the system access request.

4. The method of claim 1, further comprising receiving a system access response from the second access point comprising a grant of resources sufficient for transmitting the global cell identifier.

5. The method of claim 4, further comprising transmitting the global cell identifier over the resources.

6. The method of claim 1, wherein the first access point is a source access point and the second access point is a target access point in handover.

7. The method of claim 1, wherein determining whether to transmit the global cell identifier is based at least in part on a type of the first access point or a type of the second access point.

8. A wireless communications apparatus, comprising:
    at least one processor configured to:
        receive a set of access sequences for indicating subsequent reporting of a global cell identifier of a source access point;
        determine whether to transmit either the global cell identifier or a physical cell identifier related to the source access point to a target access point, the global cell identifier requiring more resources for transmission than the physical cell identifier;
        indicate reporting of the global cell identifier to the target access point by selecting an access sequence from the set of access sequences for inclusion as part of a system access request; and
        transmit the system access request to the target access point; and
    a memory coupled to the at least one processor.

9. The wireless communications apparatus of claim 8, wherein the at least one processor is further configured to transmit the global cell identifier of the source access point to the target access point.

10. The wireless communications apparatus of claim 9, wherein the at least one processor is further configured to receive a system access response from the target access point comprising resources for transmitting the global cell identifier of the source access point.

11. The wireless communications apparatus of claim 8, wherein the system access request is transmitted to the target access point as part of a handover procedure.

12. The wireless communications apparatus of claim 8, wherein the at least one processor is further configured to determine whether to indicate global cell identifier reporting based at least in part on a type of the source access point or a type of the target access point.

13. An apparatus, comprising:
    means for receiving a set of access sequences for indicating subsequent reporting of a global cell identifier of a first access point;
    means for determining whether to report either the global cell identifier or a physical cell identifier of the first access point to a second access point, the global cell identifier requiring more resources for transmission than the physical cell identifier;
    means for selecting an access sequence from the set of access sequences if subsequent reporting of the global cell identifier has been determined; and
    means for transmitting the selected access sequence in a system access request to the second access point comprising an indication of subsequent global cell identifier reporting and receiving a system access response comprising a resource allocation.

14. The apparatus of claim 13, further comprising means for transmitting the global cell identifier to the second access point over the resource allocation.

15. The apparatus of claim 13, wherein the first access point is a source access point and the second access point is a target access point in a handover procedure.

16. The apparatus of claim 13, wherein the means for determining whether to report the global cell identifier determines such based at least in part on a type of the first access point or a type of the second access point.

17. A computer program product, comprising:
a non-transitory computer-readable medium comprising:
code for receiving a set of access sequences for indicating subsequent reporting of a global cell identifier of a first access point;
code for causing at least one computer to determine whether to transmit either the global cell identifier or a physical cell identifier related to the first access point to a second access point, the global cell identifier requiring more resources for transmission than the physical cell identifier;
code for causing the at least one computer to indicate reporting of the global cell identifier to the second access point by selecting an access sequence from the set of access sequences for inclusion as part of a system access request; and
code for causing the at least one computer to transmit the system access request to the second access point.

18. The computer program product of claim 17, wherein selecting the access sequence includes computing a data size required for transmitting the global cell identifier.

19. The computer program product of claim 17, wherein the computer-readable medium further comprises code for causing the at least one computer to receive a system access response from the second access point comprising a grant of resources sufficient for transmitting the global cell identifier.

20. The computer program product of claim 19, wherein the computer-readable medium further comprises code for causing the at least one computer to transmit the global cell identifier over the resources.

21. The computer program product of claim 17, wherein the first access point is a source access point and the second access point is a target access point in handover.

22. The computer program product of claim 17, wherein determining whether to transmit the global cell identifier is based at least in part on a type of the first access point or a type of the second access point.

23. An apparatus, comprising:
a global cell identifier determination circuit configured to determine whether to report either a global cell identifier or a physical cell identifier of the first access point to a second access point, the global cell identifier requiring more resources for transmission than the physical cell identifier;
a system access circuit configured to:
receive a set of access sequences for indicating subsequent reporting of the global cell identifier of the first access point;
indicate reporting of the global cell identifier to the second access point by selecting an access sequence from the set of access sequences for inclusion as part of a system access request;
transmit the system access request to the second access point; and
receive a system access response comprising a resource allocation.

24. The apparatus of claim 23, further comprising a global cell identifier reporting circuit that transmits the global cell identifier to the second access point over the resource allocation.

25. The apparatus of claim 23, wherein the first access point is a source access point and the second access point is a target access point in a handover procedure.

26. The apparatus of claim 23, wherein the global cell identifier determination circuit determines whether to report the global cell identifier based at least in part on a type of the first access point or a type of the second access point.

27. A method, comprising:
providing a set of access sequences for indicating subsequent reporting of a global cell identifier of an access point, the global cell identifier requiring more resources for transmission than the first physical cell identifier;
receiving a system access request from a mobile device comprising an access sequence selected from the set of access sequences indicating subsequent reporting of the unique identifier; and
determining subsequent reporting of the global cell identifier based at least in part on locating the selected access sequence in the set of access sequences.

28. The method of claim 27, further comprising allocating resources to the mobile device sufficient for transmitting the global cell identifier based on determining the subsequent reporting of the global cell identifier.

29. The method of claim 28, further comprising receiving the global cell identifier over the allocated resources.

30. The method of claim 29, further comprising communicating with the access point using the global cell identifier to receive information related to the mobile device.

31. The method of claim 27, wherein providing the set of access sequences includes determining a number of access sequences to provide in the set of access sequences based at least in part on a local type, a type of the access point, or a type of one or more disparate surrounding access points.

32. A wireless communications apparatus, comprising:
at least one processor configured to:
provide a set of access sequences for indicating subsequent reporting of a global cell identifier from one or more mobile devices, the global cell identifier requiring more resources for transmission than a physical cell identifier;
receive a system access request from a mobile device that includes an access sequence selected from the set of access sequences; and
determine whether global cell identifier reporting is requested based at least in part on identifying the selected access sequence in the set of access sequences; and
a memory coupled to the at least one processor.

33. The wireless communications apparatus of claim 32, wherein the at least one processor is further configured to allocate resources to the mobile device for transmitting the global cell identifier based on determining that global cell identifier reporting is requested.

34. The wireless communications apparatus of claim 33, wherein that at least one processor is further configured to receive a global cell identifier of a source access point over the allocated resources.

35. The wireless communications apparatus of claim 34, wherein the at least one processor is further configured to request information related to the mobile device from the source access point using the global cell identifier.

36. An apparatus, comprising:
means for providing a set of access sequences for indicating subsequent reporting of a global cell identifier of an access point, the global cell identifier requiring more resources for transmission than a physical cell identifier;
means for obtaining an access request including an access sequence selected from the set of access sequences indicating subsequent reporting of the global cell identifier from a mobile device and granting resources to the mobile device for transmitting a global cell identifier of an access point based at least in part on the selected access sequence.

37. The apparatus of claim 36, further comprising means for receiving the global cell identifier of the access point from the mobile device over the granted resources.

38. The apparatus of claim 37, further comprising means for communicating with the access point using the global cell identifier to receive information regarding the mobile device.

39. The apparatus of claim 38, wherein the access point is a source access point in a handover procedure.

40. The apparatus of claim 36, wherein the means for providing the set of access sequences determines a number of sequences to provide in the set based at least in part on a local type or a type of one or more disparate surrounding access points.

41. A computer program product, comprising:
a non-transitory computer-readable medium comprising:
code for causing at least one computer to provide a set of access sequences for indicating subsequent reporting of a global cell identifier of an access point, the global cell identifier requiring more resources for transmission than a physical cell identifier;
code for causing the at least one computer to receive a system access request from a mobile device comprising an access sequence selected from the set of access sequences indicating subsequent reporting of the global cell identifier; and
code for causing the at least one computer to determine subsequent reporting of the global cell identifier based at least in part on locating the selected access sequence in the set of access sequences.

42. The computer program product of claim 41, wherein the computer-readable medium further comprises code for causing the at least one computer to allocate resources to the mobile device sufficient for transmitting the global cell identifier based on determining the subsequent reporting of the global cell identifier.

43. An apparatus, comprising:
an access sequence circuit that provides a set of access sequences for indicating subsequent reporting of a global cell identifier, the global cell identifier requiring more resources for transmission than a physical cell identifier; and
an access request circuit that obtains an access request including an access sequence selected from the set of access sequences indicating subsequent reporting of the global cell identifier from a mobile device and grants resources to the mobile device for transmitting a global cell identifier of an access point based at least in part on the access sequence.

44. The apparatus of claim 43, further comprising a global cell identifier receiving circuit that obtains the global cell identifier of the access point from the mobile device over the granted resources.

45. The apparatus of claim 44, further comprising a source communication circuit that receives information regarding the mobile device from the access point using the global cell identifier.

* * * * *